DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 979

T890,002

PREPARATION OF ALLYLIDENE AND BISALDEHYDE DYE INTERMEDIATES AND CORRESPONDING PHOTOGRAPHIC DYESTUFFS

John R. Owen, 1999 Lake Ave., Rochester, N.Y. 14650

Filed Mar. 26, 1970, Ser. No. 23,011
Int. Cl. C09b *23/00*
U.S. Cl. 260—240.1
No Drawing. 25 Pages Specification

A novel process is provided for preparing substituted allylidene dye intermediate having the formula:

(I)

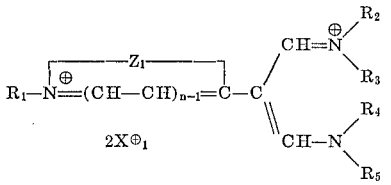

wherein $R_1$ represents alkyl, alkenyl or aryl, $R_2$, $R_3$, $R_4$ and $R_5$ each may be the same or different and represent alkyl, $Z_1$ represents the nonmetallic atoms required to complete a heterocyclic nucleus of the type used in photographic spectral sensitizing and desensitizing dyes containing from 5 to 6 atoms in the heterocyclic ring which nucleus can contain a second hetero atom such as oxygen, nitrogen, selenium, or sulfur and may contain one or more fused rings, $n$ represents a positive integer from 1 to 2 and X represents an acid anion. The above allylidene dye intermediates may be used directly to prepare spectral sensitizing dyes or may be first hydrolyzed to the corresponding bisaldehyde which may then be used to prepare spectral sensitizing dyes having the formula:

(II)

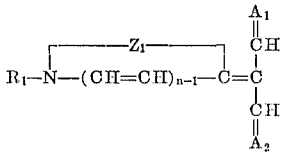

wherein $R_1$, $Z_1$ and $n$ are as defined above, $A_1$ and $A_2$ may be the same or different and represent oxygen, nuclei having the following formula:

(III)

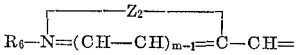

wherein $R_6$ represents alkyl, alkenyl or aryl, $m$ represents a positive integer of from 1 to 2 and $Z_2$ is as defined for $Z_1$ above, or nuclei having the formula:

(IV)

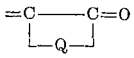

wherein Q represents the nonmetallic atoms required to complete a heterocyclic nucleus containing 5 to 6 atoms in the heterocyclic ring, which ring preferably contains from 3 to 4 carbon atoms, 1 nitrogen atom and 1 atom selected from the group consisting of nitrogen, oxygen and sulfur. An example of the preparation of an allylidene dye intermediate by the process disclosed is the preparation of 3 - dimethylamino - 2 -( 2 - benzothiazolylmethoperchlorate)allylidene dimethylammonium perchlorate which comprises reacting (a) 2,3 - dimethylbenzothiazolium p-toluenesulfonate with (b) the complex formed by the reaction of phosphorous oxychloride with N,N-dimethylformamide. An example of the preparation of a spectral sensitizing dye by the process of the disclosure is the preparation of 2-bis-(1,3-diethyl-2,4,6-trioxohexahydropyrimidinylidenemethyl)methylene - 3 - methylbenzoxazoline which comprises: (1) reacting (a) 3-ethyl-2-methylbenzoxazolium iodide with (b) the complex formed by the reaction of phosphorous oxychloride with N,N-dimethylformamide to form the intermediate 3-dimethylamino-2-(2-benzoxazolyl ethoperchlorate)allylidene dimethylammonium perchlorate; and (2) reacting said intermediate with 1,3-diethylbarbituric acid.